United States Patent [19]

Inagaki et al.

[11] Patent Number: 5,078,226
[45] Date of Patent: Jan. 7, 1992

[54] POWER STEERING APPARATUS FOR A VEHICLE WITH YAW CONTROL

[75] Inventors: Mitsuo Inagaki; Hideaki Sasaya; Shigeki Iwanami, all of Okazaki, Japan

[73] Assignee: Nippon Soken, Inc., Nishio, Japan

[21] Appl. No.: 537,943

[22] Filed: Jun. 14, 1990

[30] Foreign Application Priority Data

Jun. 15, 1989 [JP] Japan .................. 1-152809

[51] Int. Cl.$^5$ .............................................. B62D 5/06
[52] U.S. Cl. .................................. 180/141; 180/142; 180/132; 364/424.05
[58] Field of Search ............... 180/143, 132, 79.1, 180/141, 142; 364/424.05

[56] References Cited

U.S. PATENT DOCUMENTS

| 3,866,706 | 2/1975 | Linche et al. ............... 180/142 |
| 4,540,059 | 9/1985 | Shibahata et al. ............. 180/141 |
| 4,767,588 | 8/1988 | Ito ........................... 180/79.1 X |
| 4,830,127 | 5/1989 | Ito et al. ...................... 180/79.1 |
| 4,941,097 | 7/1990 | Karnopp et al. ............ 180/79.1 X |

FOREIGN PATENT DOCUMENTS

| 0353995 | 2/1990 | European Pat. Off. ......... 180/79.1 |
| 63-53176 | 3/1988 | Japan . |
| 63-192667 | 8/1988 | Japan . |
| 63-287675 | 11/1988 | Japan . |
| 64-83458 | 3/1989 | Japan . |
| 2205287 | 12/1988 | United Kingdom ............ 180/143 |

Primary Examiner—Kenneth R. Rice
Assistant Examiner—Paul Dickson
Attorney, Agent, or Firm—Cushman, Darby & Cushman

[57] ABSTRACT

A power steering apparatus for a vehicle having a hydraulic mechanism for generating a force applied to a steering mechanism for reducing a force needed to operate a steering member (wheel). A device is provided for determining a condition wherein a yaw rate generated in the vehicle does not match a steering operation of the steering member. A hydraulic or electric torque motor is operated for generating a counter steering force applied to the steering mechanism, to cancel the yaw rate which does not match the operation of the steering member.

13 Claims, 5 Drawing Sheets

POWER STEERING APPARATUS FOR A VEHICLE WITH YAW CONTROL

BACKGROUND OF THE INVENTION

1. Field of the Invention

The present invention relates to a power steering apparatus for a vehicle, such as an automobile, to obtain a stabilized condition thereof when the vehicle is running.

2. Description of the Related Art

In a known power steering apparatus for a vehicle, the effort required for operating the steering system to obtain a stabilized running condition of the vehicle becomes greater in accordance with an increase in the speed of vehicle or speed of an engine thereof.

The known power steering apparatus merely operates to prevent a too sudden steering operation during a high speed condition, and therefore, the prior art apparatus cannot prevent a steering operation which does not correspond to the speed of the vehicle, and can not prevent the occurrence of phenomena such as skidding on a low friction factor road surface, e.g., while running on a rain or snow covered road surface.

SUMMARY OF THE INVENTION

The present invention is intended to obviate the above-mentioned drawback, and therefore, an object of the present invention is to provide a power steering device for a vehicle wherein the occurrence of a yaw rate which does not correspond to the degree of movement of the steering wheel by a driver warns the driver to manipulate the steering wheels so that the yaw rate and the steering wheel movement match, and thus the stability of the vehicle during the running thereof is increased.

Therefore, according to the present invention, there is provided a power steering system for a vehicle having wheels to be steered, comprising:

a steering member;

a steering mechanism for connecting the steering member to said wheels to be steered, in such a manner that said wheels are steered in accordance with the movement of the steering member;

means for generating an assisting force in the steering mechanism for reducing the effort necessary when the steering member is moved to carry out the steering operation;

means for detecting the vehicle speed;

means for detecting a condition of the steering member when operated;

means for detecting a yaw rate of the vehicle;

means for determining a degree of the yaw rate which matches a degree of the operation of the steering member, while taking at least the vehicle speed into consideration, and;

means for generating a steering reaction force to be applied to the steering member, to thereby cancel a yaw rate which does not match the steering operation.

DESCRIPTION OF THE PREFERRED EMBODIMENTS

Figure 1:
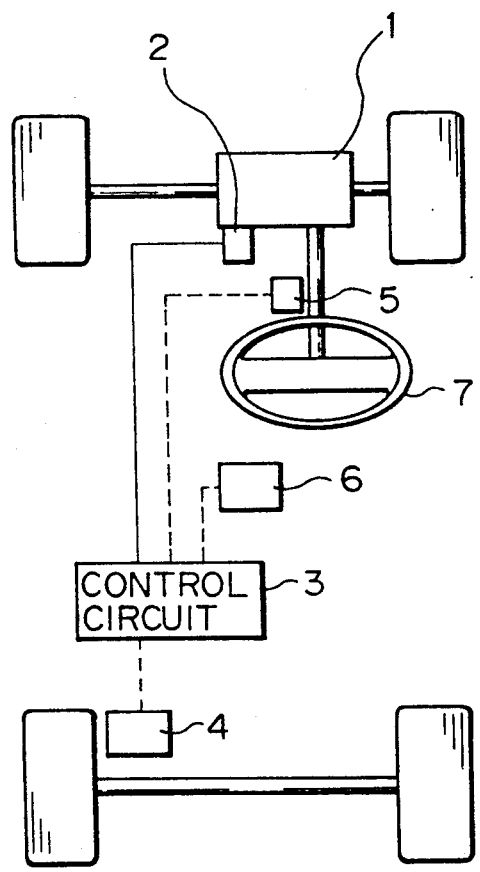
FIG. 1 is a general diagrammatic view of a vehicle provided with the power steering device according to the present invention.

Referring to FIG. 1, showing a first embodiment of the present invention, a power steering apparatus is provided with a vehicle speed sensor 4 for detecting a vehicle speed V, a steering angle sensor 5 for detecting an angle $\theta$ of a movement of a steering wheel 8, a yaw rate sensor 6 for detecting a rate $W_Y$ of a change in an angle of rotation of the vehicle about a vertical axis passing through the center of the gravity of the vehicle, a device 1 responsive to the movement of the steering wheel 7 and controlling the force needed to move the steering wheel, an actuator 2 for operating the steering force controlling device 1, and a control circuit 3 including a central processing unit (CPU) responding to signals output by the sensors 4, 5 and 6, to operate the actuator 2.

Figure 2:
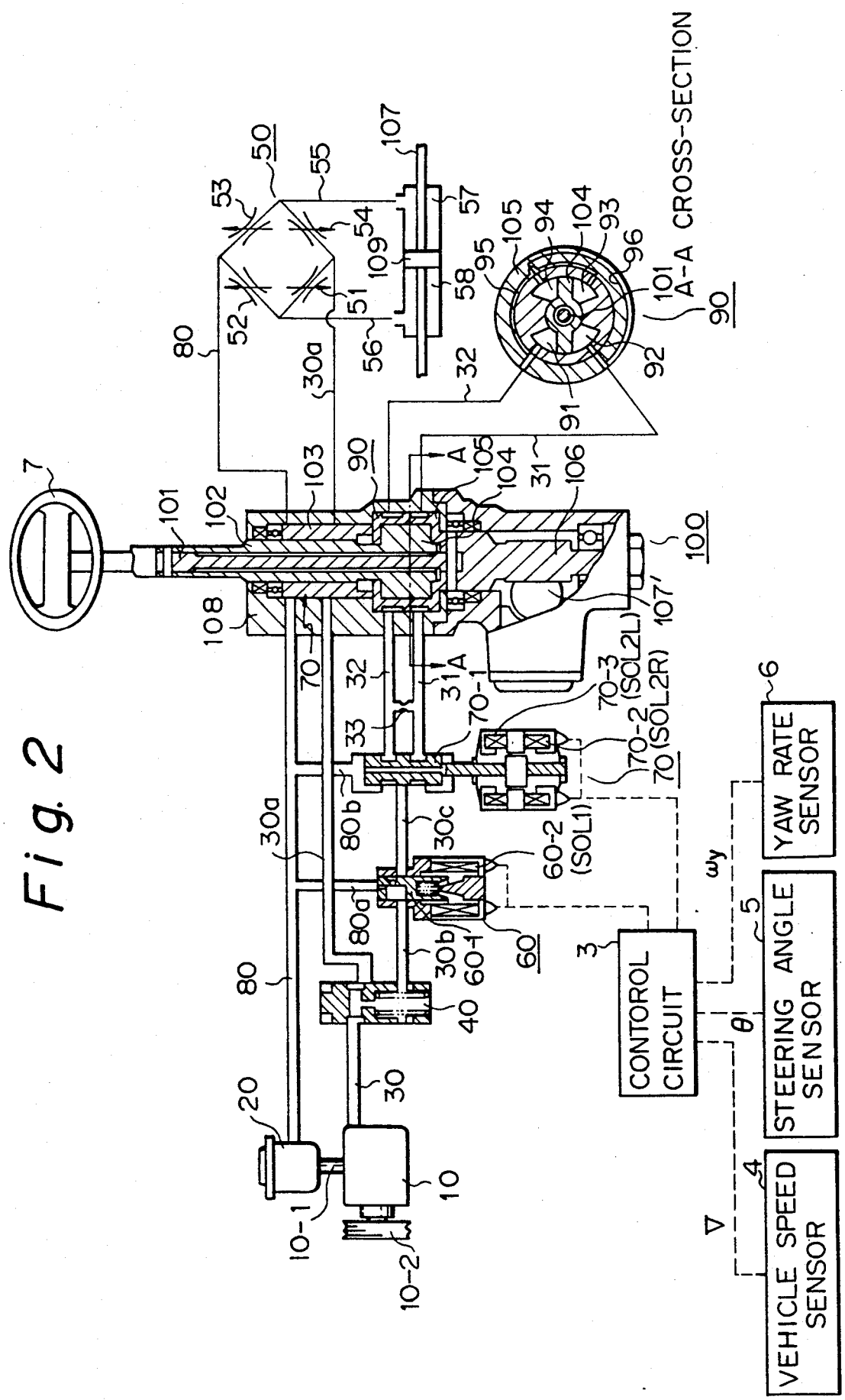
FIG. 2 shows a device for controlling the steering force and actuators in FIG. 1.

FIG. 2 is a detailed view of the steering force control device 1 and the actuator for operating same, wherein 10 denotes an oil pump having an inlet port 10-1 connected to a reservoir tank 20, and an outlet port connected to a delivery pipe 30. The oil pump 10 is further provided with a drive shaft fitted with a pulley 10-2 in kinematic connection with a crankshaft of the engine (not shown), so that a rotation of the crankshaft causes the operating oil in the reservoir tank 20 to be forced into the delivery pipe 30. The delivery pipe 30 is branched, via a flow dividing valve 40, to form a first feed passageway 30a directed to a control valve 50, and a second feed passageway 30b directed to a flow control valve 60. The flow dividing operation of the flow dividing valve 40 is attained in such a manner that a substantially constant amount of oil is allowed to flow to the feed passageway 30b. The second feed passageway 30b is further branched, via the flow control valve 60, to form a third feed passageway 30c directed to the directional control valve 70, and a return passageway 80a directed to the reservoir tank 20. The flow control valve 60 is provided with a spring-biased moving member 60-1 and a solenoid 60-2 (SOR1), whereby an increase in the electric current applied to the solenoid 60-2 causes the moving member 60-1 to be moved downward against the spring force thereon, to thereby increase the amount of operating fluid directed to the feed passageway 30c. The directional control valve 70 is provided with a switching valve member 70-1, and solenoids 70-2 (SOL2R) and 70-3 (SOL2L), for controlling the connection of the feed passageway 30c, feed passageways 31 and 32, and a return passageway 80 to the reservoir tank 20. When the first solenoid 70-2 is energized, the moving part 70-1 is moved downward and the feed passageway 30c is thus connected to the passageway 32, and the outlet passageway 31 is connected to the return passageway 80b. When the second solenoid 70-3 is energized, the moving part 70-1 is moved upward and the feed passageway 30c is thus connected to the outlet passageway 31, and the outlet passageway 32 is connected to the return passageway 80b. It should be noted that the two outlet passageways 31 and 32 are connected to each other via a throttle portion 33, which prevents an excessive increase in the pressure differential between the first and the second passageways 31 and 32.

Reference numeral 50 denotes a control valve having four variable orifices 51, 52, 53 and 54, as schematically illustrated in FIG. 2. These four variable orifices 51 to 54 are constructed in a well known manner by a valve rod 102 and valve ring 103, which move together with a pinion 106. As is well known, a rotation of the torsion bar 101 caused by steering operation causes a corresponding change in the degree of throttling of the variable orifices 51 to 54, to thereby move a piston 109 in a desired direction corresponding to the direction of the rotation of the steering wheel 7. It should be noted that the four variable orifices 50 to 54 are arranged to form a bridge circuit and thus form two opposing pairs of orifices; namely, 51 and 53, and 52 and 55. A steering operation of the steering wheel in a different direction causes a change in the degree of throttling of the two pairs of orifices. Namely, a rotation of the steering wheel in the clockwise direction causes the degree of the throttling of the first pair of orifices 51 and 53 to be reduced and the degree of throttling of the other pair of orifices 52 and 54 to be increased. In this case, the fluid from the feed passageway 30a is introduced, via the variable orifice 51 and a passageway 56, into the hydraulic pressure chamber 56, and the fluid in hydraulic chamber 57 is forced out, via the variable orifice 53 and passageway 80, to the reserve tank 20, which causes the piston 109 to be moved from the left to the right in FIG. 2, and thus causes the vehicle wheels (not shown) to be moved so that the vehicle turns to the right. Contrary to this, a rotation of the steering wheel in the counterclockwise direction causes the degree of throttling of the second pair of orifices 52 and 54 to be reduced and the degree of throttling of the first pair of orifices 51 and 53 to be increased. In this case, the fluid from the feed passageway 30a is introduced, via the variable orifice 54 and a passageway 55, into the hydraulic pressure chamber 58, and the hydraulic oil in the chamber 58 is forced out, via the orifice 53, to the return passageway 80 and reservoir tank 20, which causes the piston 109 to be moved from the right to the left in FIG. 2, and thus causes the vehicle wheels (not shown) to be moved so that the vehicle turns to the left. It should be noted that the stronger the force applied to the steering wheel 7, the larger the degree of mirror-image change of the degree of throttling of the two pairs of orifices resulting in an increase in the hydraulic pressure applied to the piston 109 of the power cylinder. As a result, the necessary steering force applied to the steering wheel 7, via a pinion 106 engaged with a rack 107' formed on the piston rod 107 extending from the piston 109, can be reduced.

A torque motor 90 is constructed by a rotary piston 104 connected to a steering wheel 7, and a rotary cylinder 105 connected to a pinion 106. Hydraulic chambers 91, 92, 93, and 94 are formed between the rotary piston 104 and the rotary cylinder 105 to form two pairs of diametrically opposite chambers, 91 and 93, and 92 and 94, respectively. The opposite chambers 91 and 93 in the first pair are in fluid communication via the passageway 95, and the opposite chambers 92 and 94 in the second pair are in fluid communication via the passageway 96. The pressure in the chamber 91 of the torque motor 90, which is higher than that in the chamber 92, causes the rotary piston 104 to be subjected to a force urging it to rotate in the counterclockwise direction, which permits a reaction force to be generated when the steering wheel is turned in the clockwise direction. The larger the pressure difference between the hydraulic chambers, the larger the degree of throttling of the four variable orifices 51 to 54 of the control valve 50, which generates a larger force in the piston 109 of the power cylinder, resulting in the generation of a rotating force at the pinion 106 engaging with the rack 107' of the piston rod 107, and thus the generation of a very strong steering reaction force.

Figure 3:
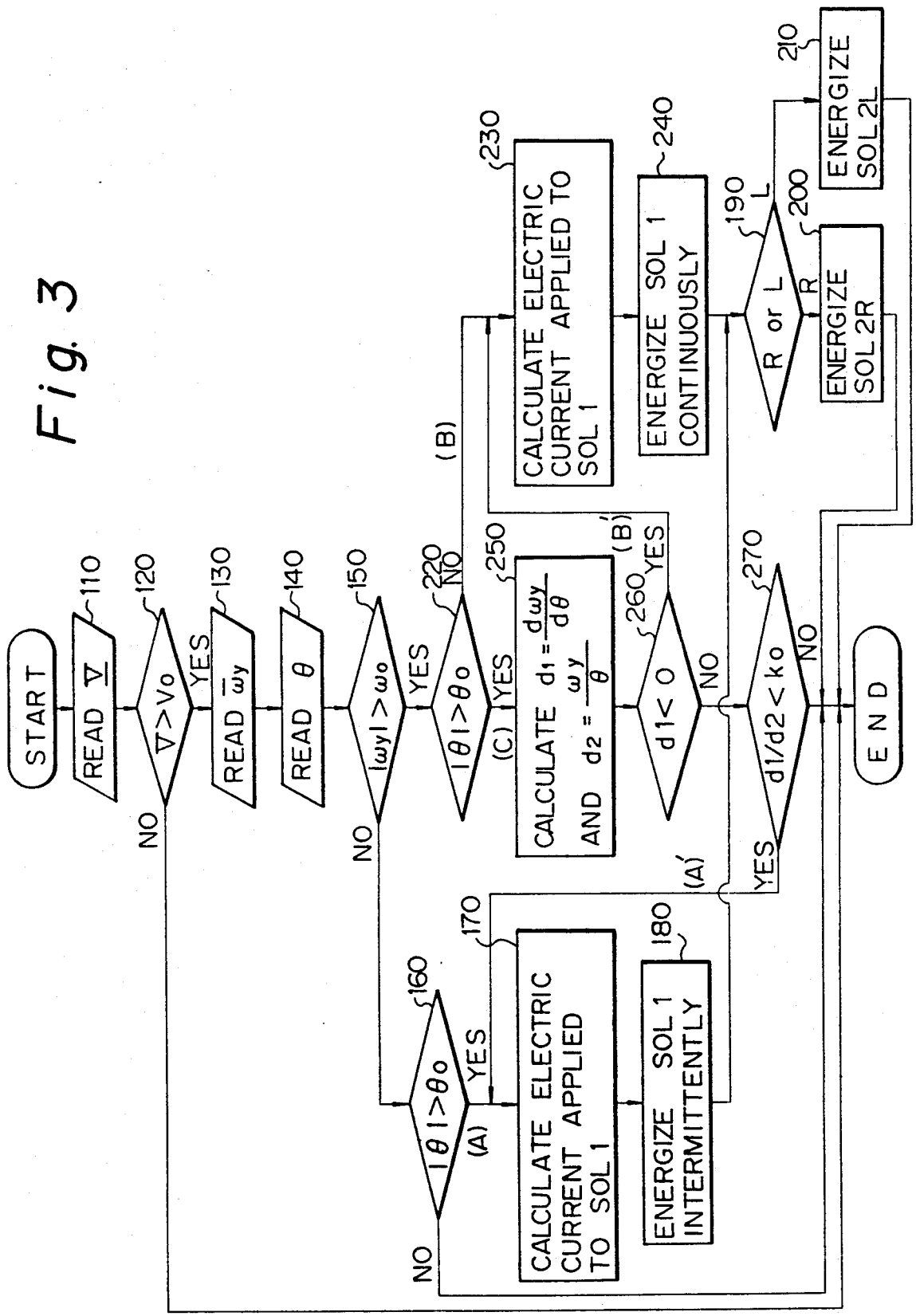
FIG. 3 is flow chart showing the control procedure for the control circuit of FIG. 2.

FIG. 3 is a flow chart showing the routine carried out by the control circuit 3. This routine is repeatedly executed by the control circuit 3. In FIG. 3, at the commencement of the routine the vehicle speed V is carried out at step 110, and at step 120 it is determined whether or not the detected value of the vehicle speed V is larger than a predetermined value $V_O$. When it is determined that $V \leq V_O$, the steps following step 130 are by-passed.

When it is determined that the vehicle speed is higher than the predetermined value $V_O$, the routine flow to step 130, where the yaw rate $W_y$ of the vehicle detected by the yaw rate sensor 6 is read out, and then to step 140, where the steering angle $\theta$ detected by the steering angle sensor 5 is read out. At step 150, it is determined whether or not the absolute value $|W_y|$ of the detected yaw rate $W_y$ is larger than a predetermined value $W_O$. When it is determined that $|W_y| \leq W_O$, the routine goes to step 160, where it is determined whether or not the absolute value $|\theta|$ of the detected steered angle $\theta$ is larger than a predetermined value $\theta_O$. When it is determined that $|\theta| \leq \theta_O$, the steps following step 170 are by-passed. When it is determined that $|\theta| > \theta_O$, the routine goes to step 170, where the value of an electric current to be applied to the solenoid 60-2 (SOL1) of the flow control valve 60 is calculated in accordance with various conditions, including the detected vehicle speed V and the steered angle $\theta$. It should be further noted that a map of the values of the electric current applied to the solenoid SOL1 with respect to the values of vehicle speed V and the steered angle $\theta$ is provided, and a well known map interpolation calculation is executed to obtain a value of the electric current corresponding to the detected engine speed and the steered angle. At step 180, an intermittent operation of the solenoid 60-1 of the flow control valve 60 is carried out, and at step 190, it is determined whether a clockwise steering reaction force R or a counter-clockwise steering reaction force L has been generated. When it is determined that the clockwise steering reaction force R has been generated, the routine goes to step 200 and the solenoid SOL2R (70-2) of the directional switching valve 70 is energized. When it is determined that the counterclockwise steering reaction force L has been generated, the routine goes to step 200 and the solenoid SOL2L (70-3) of the directional switching valve 70 is energized.

When it is determined that $|W_y| > W_O$, at step 150, the routine goes to step 220, where it is determined whether or not the absolute value $|\theta|$ of the detected steered angle $\theta$ is larger than a predetermined value $\theta_O$. When it is determined that $|\theta| \leq \theta_O$ at step 220, the routine goes to step 230 and the parameter of the electric current to be applied to the solenoid 60-2 (SOL1) of the flow control valve 60 is calculated in accordance with various conditions, including the detected vehicle speed V and the steered angle $\theta$. As for step 170, a map interpolation calculation is executed at step 230 to obtain a value of the electric current to be applied to the solenoid SOL1 and corresponding to the detected engine speed and the steered angle. At step 240, a continuous energization of the solenoid SOL1 is carried out, and the routine then goes to the steps following step 190, for energizing the solenoid SOR2R or SOL2L in accordance with the direction of the generated steering reaction force R or L.

When it is determined that $|\theta| > \theta_O$ at step 220, the routine goes to step 250, where a differential factor $d_1$ of the yaw rate $W_y$ to the steered angle $\theta$, i.e., $W_y/dt$, and the ratio of the yaw rate $W_y$ with respect to the steered angle $\theta$, i.e., $W_y/\theta$, are calculated. At step 260, it is determined if the differential factor $d_1$ obtained at step 250 is a minus value.

When it is determined that $d_1$ is a minus value, the routine goes to the step 230, 240, 190 and 200 or 210, and the routine is ended. Contrary to this, when it is determined that $d_1$ is a positive value, the routine goes to step 270, where it is determined if the ratio of the differential factor $d_1$ to the differential factor $d_2$ is larger than a predetermined value $k_O$. When it is determined that $d_1/d_2 \leq k_O$, the routine is ended, but when it is determined that $d_1/d_2 < k_O$, the routine goes to steps 170, 180, 190, and 200 or 210.

The operation of the power steering system according to the present invention realized by the execution of the above routine will now be described in more detail.

A typical situation in which the control of the present invention is useful is that wherein the vehicle has no yaw rate, regardless of a steering operation. This frequently occurs when the vehicle is running on a road having a low friction factor, e.g., a road covered by snow or ice. In this case, as shown in FIG. 3, a "no" result is obtained at step 150, and a "yes" result is obtained at step 160, so that the routine goes to step 170 as shown by an arrow A. As a result, the control circuit 3 determines the degree of opening of the flow control valve 60 such that an amount of oil corresponding to the vehicle running condition (i.e., the vehicle speed and steering angle) is introduced into the feed passageway 30c, an amount of electric current to be applied to the solenoid SOL1 is calculated, and an intermittent energization of the solenoid SOL1 at intervals of between 0.2 to 0.3 seconds is carried out.

Then the solenoid SOL2R or SOL2L incorporated in the directional switching valve 70 is energized in accordance with the direction of the steering operation. For example, a non-existence of a yaw rate regardless of a steering operation of the steering wheel for a turn to the right causes the solenoid SOL2R to be energized. Accordingly, the operating fluid introduced from the feed passageway 30c is introduced, via the feed passageway 32, into the hydraulic chamber 91 of the torque motor 90, whereby the pressure in the hydraulic chambers 91 and 93 is increased, and as a result, a force is generated to cause the rotary cylinder 104 to be rotated in the counter-clockwise direction in FIG. 2. Namely, a steering operation for a turn to the right causes the control valve 50 to operate as if the steering wheel 7 were handled for a turn to the left. Therefore, the piston rod 107 of the power cylinder forces the vehicle to be turned to the left, and a steering reaction force is transmitted via the pinion 106 connected to the piston rod 107, to warn the driver that the steering should be turned for a turn to the right. In this situation, according to this embodiment, a pulsative energization of the solenoid SOL1 is carried out so that a pulsative supply of the oil from the flow control valve 60 to the feed passageway is obtained, whereby a steering reaction is generated in the steering wheel in such a manner that the strength thereof is pulsatively changed, to warn the driver to execute a slight counter steering operation, at intervals of between 0.2 to 0.3 seconds.

The second situation wherein the control by the present invention is attained is that in which a yaw rate is generated in the vehicle even if the vehicle is not steered, which frequently occurs on a low friction factor road. In this situation, a direction of the control of the control circuit as shown by an arrow B in FIG. 3 occurs, and the amount of oil to be supplied to the torque motor 90 is calculated based on the degree of the yaw rate $W_y$ and the vehicle speed. Based on this oil amount, the amount of electric current to be applied to the solenoid SOL1 of the flow control valve 60 is calculated and applied thereto. Then, the solenoid SOR2R or SOL2L of the directional switching valve 70 is selectively energized in accordance with the direction of the yaw rate $W_y$. Assuming that the yaw rate is to, for example, the right, but a steering operation is not carried out, in such a situation the control circuit 3 controls the solenoid SOL1 of the solenoid 60 of the flow control valve 60, to control the amount of oil supplied to the directional control valve 60. Furthermore, the solenoid SOL2R of the directional switching valve 70 is energized so that the operating fluid is introduced into the hydraulic chamber 91 of the torque motor 90 via the feed passageway 32. As in the first situation, the torque motor 90, the control valve 50 and the piston rod 107 of the power cylinder is operated to turn the vehicle to the left, which warns the driver to move the steering wheel 7 in the counter-clockwise direction.

The third situation wherein the present invention is useful is that in which a yaw rate generated in the vehicle does not correspond to the degree of steering. In this case, the apparatus according to the present invention carries out two separate operations.

Figure 4:
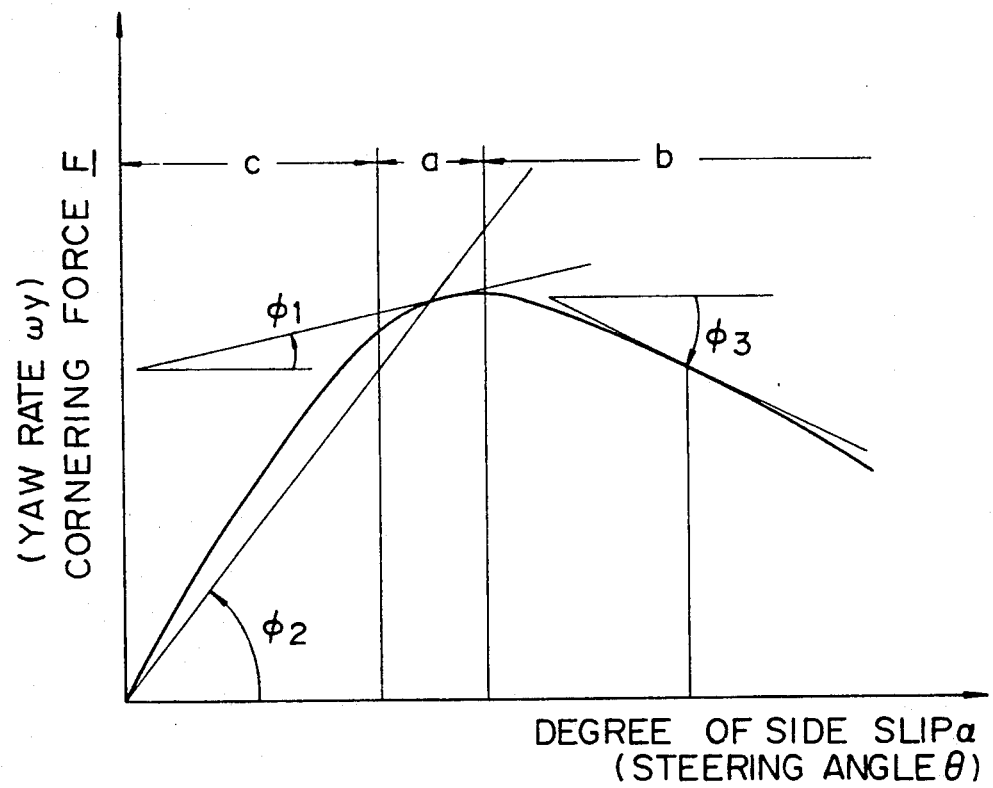
FIG. 4 shows a relationship between a side slip angle and a yaw rate.

First, a relationship between a side slip angle $\alpha$ of the vehicle and the cornering force as applied to the vehicle wheels, which is well known, is shown in FIG. 4. When the side slip angle $\alpha$ is increased, the cornering force F is proportionally increased when the side slip angle $\alpha$ is small, but the gradient of the cornering force F is gradually decreased when the side slip angle $\alpha$ is increased, and the gradient reaches zero and begins to have a negative value. The inventors of this invention found that a relationship between the steering angle $\theta$ on the abscissa and the yaw rate $W_y$ on the ordinate attains substantially the same relationship as shown in FIG. 4, and thus the process for dealing with the third situation is treated in a similar manner. The process in the third situation proceeds in the direction of C in FIG. 3. Namely, based on the yaw rate $Y_y$ and the steered angle $\theta$, the differential factor $d_1$ ($=dW_y/d\theta$) and the ratio $d_2$ ($=W_y/\theta$) are calculated, and as a result, the control of the direction B' in FIG. 3 is obtained when the yaw rate is reduced regardless of whether or not $d_1 < 0$, i.e., the steered angle $\theta$ is increased. Similar to the situation 2 previously described, a steering reaction force is continuously generated in the steering, so that a warning is given to the driver to reduce the steered angle $\theta$. This operation is explained with reference to FIG. 4. When the vehicle is in the area of a large value of side slip angle $\alpha$ designated by b, the differential factor $d_1$ is equal to $\tan \phi_3$. Since $\phi_3 < 0$, $d_1 < 0$, which causes an unstable turning movement of the vehicle, the driver is warned to return to a stable area C wherein the steered angle $\theta$ and the yaw rate $W_y$ have a positive proportional relationship.

When the vehicle is in the area of medium side slip angle, designated by a, the process as shown by an arrow (A)' in FIG. 3 is carried out. This area a is a transition area wherein the yaw rate $W_y$, which has been proportionally increased in accordance with the increase in the value of the steering angle, begins to provide a small value of the rate of the change $dW_y$ with respect to the change $d\theta$ in the steered angle $\theta$ of the steering wheel 7. According to the embodiment in FIG. 3, a determination of this area a is obtained by determining, in step 270, if the ratio of the differential factor $d_1$ ($=dW_y/d\theta=\tan \phi_1$) to the differential factor $d_2$ ($=W_y/\theta=\tan \phi_2$) is smaller than a predetermined value $k_0$. When this determination is obtained, the control circuit 3 executes a process (A)' in FIG. 3 so that, as in the first case, an intermittent steering reaction force is created at the steering wheel 7, to warn the driver that there is a risk of an occurrence of vehicle spin and to warn the driver to handle the steering wheel 7 properly to prevent this spin.

In the above first embodiment, the control valve 50 and power cylinder 109 compose an assisting means for assisting the movement of the steering wheel 7. The steps 150, 160, 220, 260, and 270 compose a means for determining if a yaw rate generated in the steering wheel does not match the steering operation, and in steps 170, 180, 230, 240, 190, 200, and 210, the flow control valve 60, the directional control valve 70, and the torque motor 90 compose a drive means for generating a steering reaction force to the steering in such a manner that the steering operation corresponds to the generated yaw rate.

Figure 5:
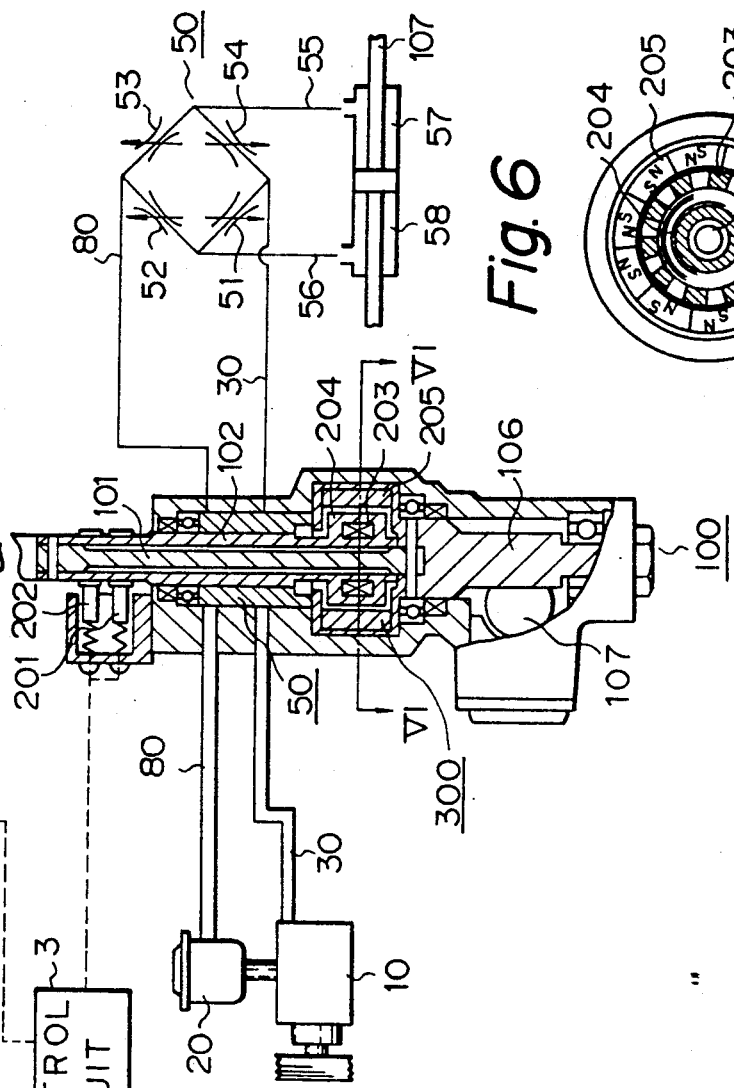
FIG. 5 shows a second embodiment of the present invention.
Figure 6:
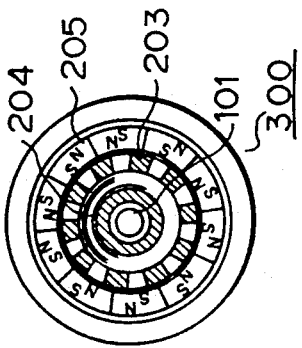
FIG. 6 is a cross-sectional view taken along the line VI—VI in FIG. 5

FIG. 5 shows a second embodiment of the present invention, wherein the oil feed passageway from the outlet port of the oil pump 10 is directly connected to the control valve 50. Furthermore, in place of the hydraulic type torque motor 90, an electrically operated torque motor 300 is employed. This electrically operated torque motor 300 is provided with a rotor connected to the steering wheel 7, a control coil 203 encircled by the rotor, and poles 204 which are alternately magnetized when the control coil 203 is energized. The electric torque motor is further provided with a stator 205, which cooperates with the pinion 106 for operating the piston rod 107, and which is constructed by a tubular magnet member having a plurality of circumferentially spaced portions which are magnetized in the radial direction in such a manner that circumferentially adjacent portions are oppositely magnetized. Furthermore, the control coil 203 is provided with ends extending to a pair of slip rings 201 and 202, respectively, which are connected to a wiring to the control circuit 3.

An operation of the power steering apparatus of the second embodiment will now be explained. As in the procedures of (A) and (A)' of the first embodiment, a degree of energization of the control coil 203 is calculated and an intermittent energization of the control coil 203 is carried out, and as in the procedures of (B) and (B)' of the first embodiment, a degree of the energization of the control coil 203 is calculated, and a continuous energization of the control coil 203 is carried out. Furthermore, a switching of the direction of the steering reaction force in the clockwise or counter-clockwise direction is made by the switching the direction of the electric current from the control circuit 3 via the slip rings 201 and 202.

According to the present invention, a reaction force is applied to the steering system when a generated yaw rate does not match the steering operation, to make the yaw rate and the steering operation conform, whereby the driver is motivated to execute a steering operation, and as a result, an unstable running condition of the vehicle, such as a side slip or spin, is prevented. Furthermore, even if such an unstable running condition occurs, a quick recovery to a stable running condition is obtained. In addition, where an inconsistency between the steering operation and the generated yaw rate exists, a steering reaction force is applied to the steering system to make them conform, and upon noticing this steering reaction force from the steering wheel, the driver is warned that the vehicle is running under an unstable condition, and thus will drive very carefully.

Although the present invention is described with reference to embodiments, many modifications and changes can be made by those skilled in this art without departing from the scope and spirit of the invention.

We claim:

1. A power steering system for a vehicle having wheels to be steered, comprising:
   a steering member;
   a steering mechanism for connecting the steering member with said wheels to be steered so that said wheels are steered in accordance with a movement of the steering member;
   means for generating an assisting force in the steering mechanism for reducing an effort which is necessary for moving the steering member when carrying out a steering operation;
   means for detecting a vehicle speed;
   means for detecting a condition of the steering member during an operation thereof;
   means for detecting an actual yaw rate of the vehicle;
   means for detecting whether said actual yaw rate matches a degree of an operation of the steering member, while taking at least the vehicle speed into consideration; and
   means for generating, only when it is determined that the actual yaw rate does not match a degree of operation of the steering member, a counter steering force to be applied to the steering mechanism in a direction corresponding to a situation of the vehicle which has caused the determined difference between degree of operation and actual yaw rate, thereby alerting a driver to drive the vehicle safely in accordance with said situation.

2. A power steering system according to claim 1, wherein it further comprises means for determining if the detected vehicle speed is higher than a predetermined value, and said generating means generates the steering reaction force only if it is determined that the vehicle speed is higher than the predetermined value.

3. A power steering system according to claim 1, wherein said generating means comprise means connected to the steering mechanism for driving the steering mechanism in a desired steering direction, means for calculating a desired degree of the steering reaction force to be generated for cancelling a yaw rate which does not match the steering operation of the steering member, and means for operating the drive means to obtain the calculated steering reaction force.

4. A power steering system for a vehicle having wheels to be steered, comprising:

a steering member;
a steering mechanism for connecting the steering member with said wheels to be steered so that said wheels are steered in accordance with a movement of the steering member;
means for generating an assisting force in the steering mechanism for reducing an effort which is necessary for moving the steering member when carrying out a steering operation;
means for detecting a vehicle speed;
means for detecting a condition of the steering member during an operation thereof;
means for detecting an actual yaw rate of the vehicle;
means for determining whether said actual yaw rate matches a degree of an operation of the steering member, while taking at least the vehicle speed into consideration;
means for generating a steering reaction force to be applied to the steering member to thereby cancel a yaw rate which does not match a degree of operation of the steering member; and
means for determining if the detected vehicle speed is higher than a predetermined value, and said generating means generates the steering reaction force only when the vehicle speed is higher than the predetermined value;
wherein said drive means comprises a hydraulic motor connected to the steering mechanism, a hydraulic system connected to the hydraulic motor for obtaining a rotational movement of the steering mechanism in a desired steering direction, first valve means for controlling a direction of flow of an operating liquid to the hydraulic motor, and second valve means for controlling an amount of fluid supplied to the hydraulic motor for obtaining a desired steering reaction force.

5. A power system according to claim 3, wherein said drive means comprises an electrical motor connected to the steering mechanism, means for controlling a direction of an electric signal as applied to the electric motor, and means for controlling a degree of strength of the electric signal for obtaining a desired steering reaction force.

6. A power steering system for a vehicle having wheels to be steered, comprising:
a steering member;
a steering mechanism for connecting the steering member with said wheels to be steered so that said wheels are steered in accordance with a movement of the steering member;
means for generating an assisting force in the steering mechanism for reducing an effort necessary to move the steering member when carrying out a steering operation;
means for detecting a condition of the steering member when operated;
means for detecting an actual yaw rate of the vehicle;
means responding to a signal detected by the steering condition detecting means for determining if the steering member is operated more than a predetermined steering value;
means responsive to a signal from the yaw rate detecting means for determining if the actual yaw rate is larger than a predetermined yaw value;
means for generating, only upon a determination that a steering operation more than the predetermined steering value is carried out by the steering operation detecting means and that the yaw rate as detected by the yaw rate detecting means is smaller than the predetermined yaw value, a counter steering force to be applied to the steering mechanism in a direction corresponding to a situation of the vehicle which has caused said determination, thereby alerting a driver to drive the vehicle safely in accordance with said situation.

7. A steering system according to claim 6, further comprising means for allowing an intermittent transmission of the counter steering force to the steering mechanism upon the determination of the steering operation and when the yaw rate is not detected.

8. A power system for a vehicle having wheels to be steered, comprising:
a steering member;
a steering mechanism for connecting the steering member with said wheels to be steered so that said wheels are steered in accordance with a movement of the steering member;
means for generating an assisting force in the steering mechanism for reducing an effort necessary to move the steering member when carrying out a steering operation;
means for detecting a condition of the steering member when operated;
means for detecting an actual yaw rate of the vehicle;
means responding to a signal detected by the steering detecting means for determining if the steering member is operated more than a predetermined steering value;
means responsive to a signal from the yaw rate detecting means for determining if the yaw rate as detected is larger than a predetermined value;
means for generating, only upon a determination that a steering operation more than the predetermined steering value is not carried out by the steering operation detecting means and that the actual yaw rate as detected by the yaw rate detecting means is larger than the predetermined value, a counter steering force to be applied to the steering mechanism in such a manner that the turning movement otherwise generated in the vehicle by the yaw rate is cancelled.

9. A power steering system according to claim 8, further comprising means for allowing a continuous transmission of the generated counter steering force upon a determination that the steering operation is not carried out and determination of a yaw rate.

10. A power steering system for a vehicle having wheels to be steered, comprising:
a steering member;
a steering mechanism for connecting the steering member with said wheels to be steered so that said wheels are steered in accordance with a movement of the steering member;
means for generating an assisting force in the steering mechanism for reducing an effort necessary moving the steering member when carrying out a steering operation;
means for detecting a condition of the steering member when operated;
means for detecting a yaw rate of the vehicle;
means, responding to a signal detected by the steering condition detection means and yaw rate detection means, for calculating a rate of change of the value of the yaw rate to the change in the angle of the steering member when operated;

means, upon a determination of a decrease in said rate of change of value of the yaw rate calculated by said calculating means, for generating a counter steering force to be applied to the steering mechanism in a direction opposite to the direction of the operation of the steering by the assisting force generation means; and means for allowing a continuous transmission of the counter steering force to the steering mechanism upon the determination of decrease in the yaw rate while the degree of the steering operation is increased.

11. A power system for a vehicle having wheels to be steered, comprising:

a steering member;

a steering mechanism for connecting the steering member with said wheels to be steered so that said wheels are steered in accordance with a movement of the steering member;

means for generating an assisting force in the steering mechanism for reducing an effort necessary to move the steering member when carrying out the steering operation;

means for detecting a condition of the steering member when operated;

means for detecting a yaw rate of the vehicle;

means, responding to a signal detected by the steering condition detection means and yaw rate detection means, for calculating a rate of change of the value of the yaw rate to the change in the angle of the steering member when operated;

means for calculating a ratio of the yaw rate to the steering angle;

means for determining, from the ratio of the yaw rate to the steering angle, a condition wherein an increase of the rate of the change in the yaw rate is decreased with respect to the increase in the degree of the operation of the steering member for generating a counter steering force to be applied to the steering mechanism in as direction opposite to the direction of the operation of the steering by the assisting force generation means; and means for allowing an intermittent transmission of the counter steering force to the steering mechanism upon a determination of a condition where the increase of the rate of the change in the yaw rate is decreased with respect to the increase in the degree of the operation of the steering member.

12. A power system for a vehicle having wheels to be steered, comprising:

a steering member;

a steering mechanism for connecting the steering member with said wheels to be steered so that said wheels are steered in accordance with a movement of the steering member;

means for generating an assisting force in the steering mechanism for reducing an effort necessary to move the steering member when carrying out steering operation;

means for detecting a condition of the steering member when operated;

means for detecting a yaw rate of the vehicle;

means, responding to a signal detected by the steering condition detection means and yaw rate detection means, for calculating a rate of change of the value of the yaw rate to the change in the angle of the steering member when operated;

means, upon determination of a decrease in said rate of change value of the yaw rate calculated by said calculating means, for generating a counter steering force to be applied to the steering mechanism in a direction opposite to the direction of the operation of the steering by the assisting force generation means.

13. A power system for a vehicle having wheels to be steered, comprising:

a steering member;

a steering mechanism for connecting the steering member with said wheels to be steered so that said wheels are steered in accordance with a movement of the steering member;

means for generating an assisting force in the steering mechanism for reducing an effort necessary to move the steering member when carrying out the steering operation;

means for detecting a condition of the steering member when operated;

means for detecting a yaw rate of the vehicle;

means, responding to a signal detected by the steering condition detection means and yaw rate detection means, for calculating a rate of change of the value of the yaw rate to the change in the angle of the steering member when operated;

means for calculating a ratio of the yaw rate to the steering angle;

means for determining, from the ratio of the degree of change of the yaw rate to the change in the angle of the steering member and a ratio of the yaw rate to the steering angle, a condition wherein an increase of the rate of the change in the yaw rate is decreased with respect to the increase in the degree of the operation of the steering member for generating a counter steering force to be applied to the steering mechanism in a direction opposite to the direction of the operation of the steering by the assisting force generation means.

* * * * *